United States Patent
Lee et al.

(10) Patent No.: US 11,108,458 B2
(45) Date of Patent: Aug. 31, 2021

(54) METHOD AND APPARATUS FOR COMBINING PLURALITY OF RADIO SIGNALS

(71) Applicant: Samsung Electronics Co., Ltd., Gyeonggi-do (KR)

(72) Inventors: Joohyun Lee, Gyeonggi-do (KR); Seijoon Shim, Seoul (KR); Hayoung Yang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 134 days.

(21) Appl. No.: 16/473,916

(22) PCT Filed: Jan. 5, 2018

(86) PCT No.: PCT/KR2018/000218
§ 371 (c)(1),
(2) Date: Jun. 26, 2019

(87) PCT Pub. No.: WO2018/128438
PCT Pub. Date: Jul. 12, 2018

(65) Prior Publication Data
US 2021/0075492 A1 Mar. 11, 2021

(30) Foreign Application Priority Data
Jan. 5, 2017 (KR) .................. 10-2017-0001695

(51) Int. Cl.
*H04B 7/08* (2006.01)
*H04L 25/02* (2006.01)

(52) U.S. Cl.
CPC ....... *H04B 7/0885* (2013.01); *H04L 25/0204* (2013.01)

(58) Field of Classification Search
CPC .................. H04L 25/0204; H04B 7/0885
See application file for complete search history.

(56) References Cited

U.S. PATENT DOCUMENTS

| 6,888,809 B1 | 5/2005 | Foschini et al. | |
| 9,867,192 B2 * | 1/2018 | Krzymien | H04B 7/0639 |
| 10,069,547 B2 * | 9/2018 | Wang | H04B 7/0617 |

(Continued)

OTHER PUBLICATIONS

PCT/ISA/210 Search Report issued on PCT/KR2018/000218, pp. 19.

(Continued)

*Primary Examiner* — Jaison Joseph
(74) *Attorney, Agent, or Firm* — The Farrell Law Firm, P.C.

(57) ABSTRACT

This disclosure relates to a 5G or pre-5G communication system to be provided to support a higher data transmission rate after a 4G communication system such as LTE. An apparatus that combines a plurality of radio signals according to an embodiment of the present invention comprises: a plurality of antennas which receive the plurality of radio signals; a baseband modem which generates channel estimation information related to the plurality of radio signals and combines the plurality of radio signals on the basis of combining control information; and a controller which generates the combining control information on the basis of the channel estimation information and preset configuration information and transmits the combining control information to the baseband modem.

13 Claims, 7 Drawing Sheets

(56) References Cited

U.S. PATENT DOCUMENTS

| | | | |
|---|---|---|---|
| 2004/0042532 A1* | 3/2004 | Artamo | H04B 7/0857 |
| | | | 375/148 |
| 2004/0087275 A1 | 5/2004 | Sugar et al. | |
| 2007/0041464 A1 | 2/2007 | Kim et al. | |
| 2011/0096860 A1 | 4/2011 | Catreux et al. | |
| 2013/0028341 A1* | 1/2013 | Ayach | H04B 7/0478 |
| | | | 375/267 |
| 2015/0229496 A1 | 8/2015 | Hou | |
| 2015/0326293 A1 | 11/2015 | Lee et al. | |
| 2016/0173184 A1 | 6/2016 | Tian et al. | |

OTHER PUBLICATIONS

PCT/ISA/237 Written Opinion issued on PCT/KR2018/000218, pp. 6.

Telatar, Emre, Capacity of Multi-antenna Gaussian Channels, European Transactions on Telecommunications, 1999, vol. 10, Issue 6, pp. 585-595 (11 pp.).

\* cited by examiner

METHOD AND APPARATUS FOR COMBINING PLURALITY OF RADIO SIGNALS

PRIORITY

This application is a National Phase Entry of PCT International Application No. PCT/KR2018/000218 which was filed on Jan. 5, 2018, and claims priority to Korean Patent Application No. 10-2017-0001695, which was filed on Jan. 5, 2017, the content of each of which is incorporated herein by reference.

TECHNICAL FIELD

The disclosure relates to a method and apparatus for combining a plurality of radio signals in a baseband modem that receives multiple radio signals corresponding to a plurality of antennas.

BACKGROUND ART

Since the commercial deployment of 4G communication systems, efforts have been made to develop improved 5G or pre-5G communication systems to meet the ever increasing demand for wireless data traffic. As such, 5G or pre-5G communication systems are also called "beyond 4G network" or "post LTE system".

To achieve higher data rates, 5G communication systems consider utilization of the mmWave band (e.g., 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems.

To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like.

In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

To improve reception performance in a wireless communication system, the technique of transmitting and receiving using a plurality of antennas is widely used. When a plurality of antennas are used, the receiver is implemented in the base station so as to be able to combine radio signals corresponding to a preset number of antennas.

With recent advances in antenna structure and multiple-input and multiple-output (MIMO) technology, there are an increasing number of systems that employ a much larger number of antennas than the number of antennas that can be handled by conventional receiver modems.

In particular, when the number of base station antennas increases to several tens or more as in the case of FD-MIMO (full-dimensional MIMO), it is not possible to implement a receiver modem capable of combining all the antennas. Additionally, with the introduction of technologies such as cooperative multi-point (CoMP) reception, virtual RAN (vRAN), and cascade remote radio head (RRH), antennas of neighbor cells can be further utilized while the receiver modem is implemented based on the number of antennas of a single cell. Hence, it is sometimes necessary to handle more receive antennas than the number of antennas that can be combined by the receiver modem.

DISCLOSURE OF INVENTION

Technical Problem

The disclosure proposes a scheme that can reduce the complexity of receiver implementation and minimize the performance loss compared with a receiver combining all receive antennas. In this scheme, when there are more receive antennas than the number of antennas that can be combined by one reception module in the baseband modem, the radio signals corresponding to all the receive antennas are divided into a plurality of sets and connected to at least one reception module for reception.

Solution to Problem

The disclosure proposes a method that can reduce the complexity of the receiver and improve the performance compared with combining all the antenna signals. In this method, when there are more receive antenna signals than the number of antennas that can be combined by the baseband modem of the receiver, the receive antenna signals are summed or divided into an appropriate number of groups and processed by a plurality of combining modules based on the spatial correlation properties of the antennas and channels. In addition, when the number of receive antennas or the spatial correlation characteristic changes, the connection between the antenna groups and the combining modules is adjusted through measurement so as to ensure the optimum receive antenna combining gain.

According to an embodiment of the disclosure, there is provided an apparatus for combining a plurality of radio signals. The apparatus may include: a plurality of antennas configured to receive multiple radio signals; a baseband modem configured to generate channel estimation information related to the multiple radio signals, and combine the radio signals based on combining control information; and a controller configured to generate the combining control information based on the channel estimation information and preset configuration information, and output the combining control information to the baseband modem.

The configuration information may include information regarding at least one of the number of antennas (Nrx), the number of combining modules in the baseband modem (L), the number of radio signals that can be combined by one combining module (Mrx), or spatial correlation information of the antennas (Rsp).

The baseband modem may include: at least one combining module configured to generate the channel estimation information and output the same to the controller, and combine the radio signals; an antenna connection module configured to map the antennas to the at least one combining module based on the combining control information; and a decoder configured to decode the combined radio signals.

The controller may be configured to utilize the spatial correlation information (Rsp) set in advance or the spatial correlation information (Rsp) generated based on the channel estimation information.

In one embodiment, if Equation 1 below is satisfied, $$Nrx > L \times Mrx \quad \text{[Equation 1]}$$

the controller may be configured to specify a weight for at least one of the radio signals corresponding to the plurality of antennas based on the channel estimation information, and generate the combining control information including information on the specified weight.

In another embodiment, if Equation 2 below is satisfied, $$Nrx \leq L \times Mrx \quad \text{[Equation 2]}$$

the controller may be configured to group the plurality of antennas into L antenna groups based on the channel estimation information and the spatial correlation information, and generate the combining control information including information on the antenna groups.

The antenna connection module may include: at least one multiplier configured to specify a weight for at least one of the radio signals corresponding to the plurality of antennas; and at least one adder configured to map the weighted radio signals to the at least one combining module.

The baseband modem may further include a final combining module that is configured to receive signals from the at least one combination module, combine the signals to generate a final combined signal, and output the final combined signal to the decoder.

According to an embodiment of the disclosure, there is provided a method for combining a plurality of radio signals. The method may include: receiving multiple radio signals; generating channel estimation information related to the multiple radio signals; generating combining control information based on the channel estimation information and preset configuration information; and combining the multiple radio signals based on the combining control information.

Advantageous Effects of Invention

According to an embodiment of the disclosure, the combining method and apparatus can minimize the performance loss and maintain the antenna combining gain even when the number of receive antennas is greater than the number of antennas that the baseband modem can handle.

According to an embodiment of the disclosure, the combining method and apparatus can obtain an optimal antenna combining gain by grouping and combining a plurality of radio signals corresponding to a plurality of receive antennas in the baseband modem.

MODE FOR THE INVENTION

Hereinafter, embodiments of the disclosure are described in detail with reference to the accompanying drawings. The same or similar reference symbols are used throughout the drawings to refer to the same or like parts. Descriptions of well-known functions and structures incorporated herein may be omitted to avoid obscuring the subject matter of the disclosure.

Descriptions of functions and structures well known in the art and not directly related to the disclosure may be omitted for clarity and conciseness without obscuring the subject matter of the disclosure.

In the drawings, some elements are exaggerated, omitted, or only outlined in brief, and thus may be not drawn to scale. The same or similar reference symbols are used throughout the drawings to refer to the same or like parts.

The aspects, features, and advantages of the disclosure will be more apparent from the following description taken in conjunction with the accompanying drawings. The description of the embodiments is to be construed as exemplary only and does not describe every possible instance of the disclosure. It should be apparent to those skilled in the art that the following description of the disclosure is provided for illustrative purposes only and not for the purpose of limiting the disclosure as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module", or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose large components and units. Components and units may be configured to drive a device or one or more processors in a secure multimedia card.

Next, embodiments of the disclosure are described in detail with reference to the accompanying drawings. Descriptions of well-known functions and structures incorporated herein may be omitted to avoid obscuring the subject matter of the disclosure. The terms described below are defined in consideration of their functions in the disclosure, and these may vary depending on the intention of the user, the operator, or the custom. Hence, their meanings should be determined based on the overall contents of this specification.

Figure 1:
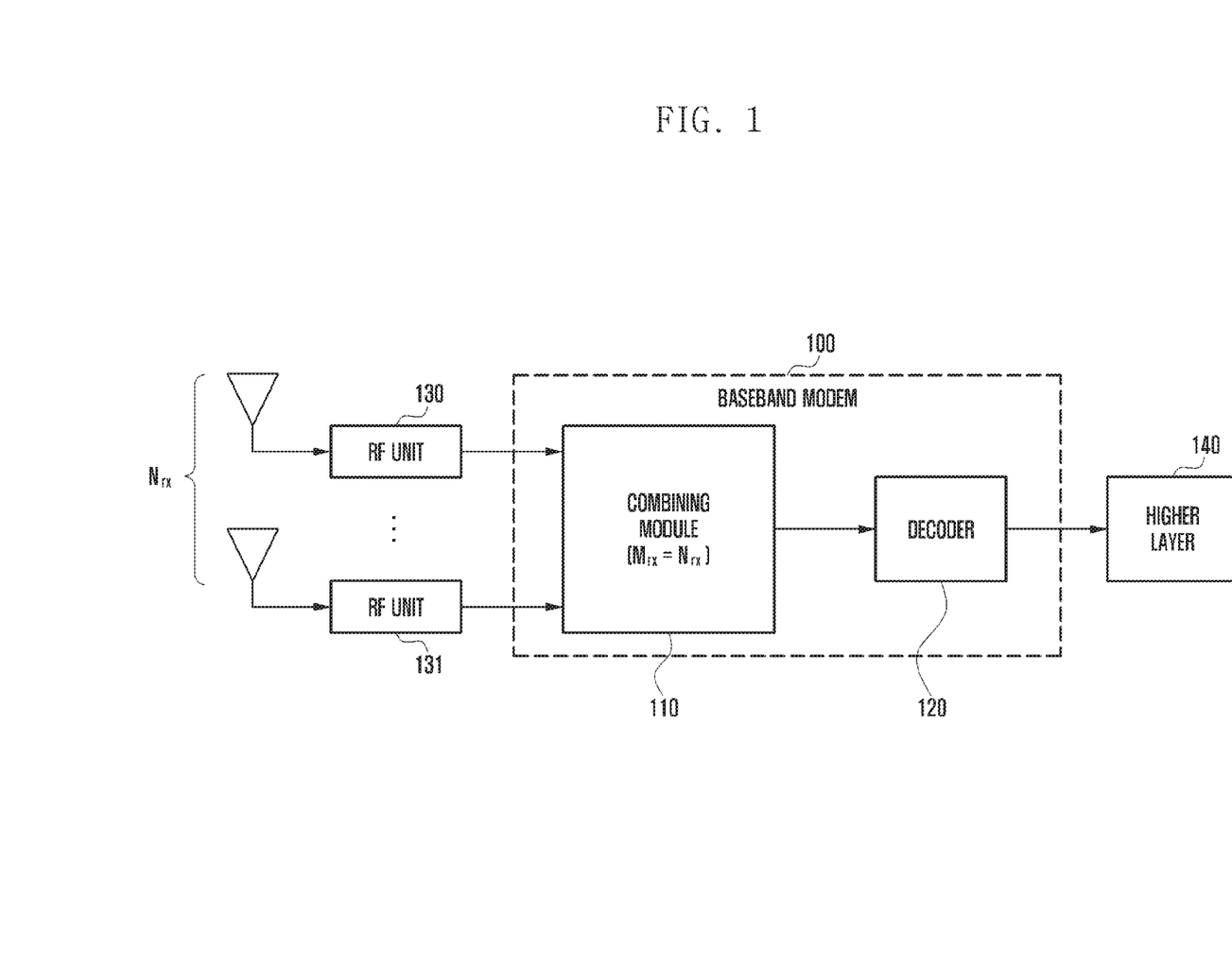
FIG. 1 shows an example of a baseband modem receiving a plurality of radio signals.

FIG. 1 shows an example of a baseband modem receiving a plurality of radio signals.

With reference to FIG. 1, the radio frequency (RF) units 130 and 131 may receive Nrx radio signals from the Nrx receive antennas (here, Nrx is a natural number greater than or equal to 2) and transmit the Nrx radio signals to the baseband modem 100.

The baseband modem 100 may include a combining module 110 and a decoder 120. The combining module 110 may process Mrx radio signals received from Mrx radio antennas (here, Mrx is a natural number greater than or equal to 2).

In FIG. 1, as Nrx=Mrx, the combining module 110 can combine Nrx radio signals from the RF units 130 and 131 to generate a combined signal. The combining module 110 may transmit the combined signal to the decoder 120, and the decoder 120 may decode the combined signal and transmit the decoded signal to the higher layer 140.

That is, in FIG. 1, when the number of receive antennas is small and fixed, a baseband modem can be implemented to combine the same number of antennas as the number of receive antennas, and thus radio signals of all the receive antennas can be combined and channel decoding can be performed.

Generally, equal gain combining (EGC), maximal ratio combining (MRC), and interference rejection combining (IRC) are used for combining radio signals of plural receive antennas. Although EGC and MRC have complexity proportional to the number of antennas, they are vulnerable to interference and are not frequently used in recent commercial mobile communication systems. On the other hand, IRC is robust against interference and is applied in most mobile communication systems. However, as IRC has complexity proportional to at least the square of the number of antennas, it is difficult to implement an IRC receiver for eight or more antennas.

Recently, there are cases where the number of receive antennas is greater than the number of antennas that can be handled by a single combining module of the receiver (e.g., FD-MIMO), or where the number of receive antennas to be handled by the receiver increases depending on the environment (e.g., UL CoMP, vRAN, or cascade RRH).

Figure 2:
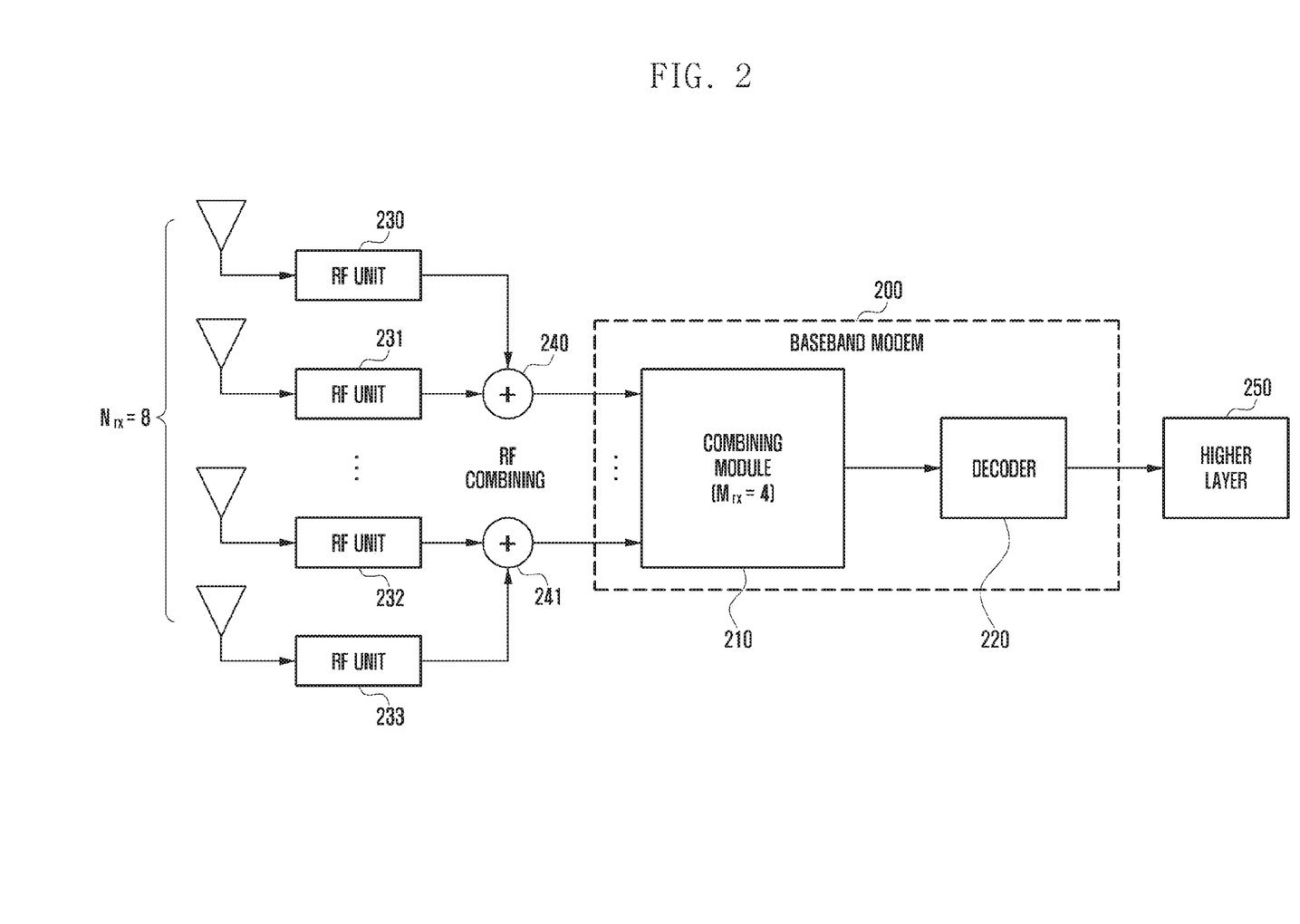
FIG. 2 shows another example of a baseband modem receiving a plurality of radio signals.
Figure 3:
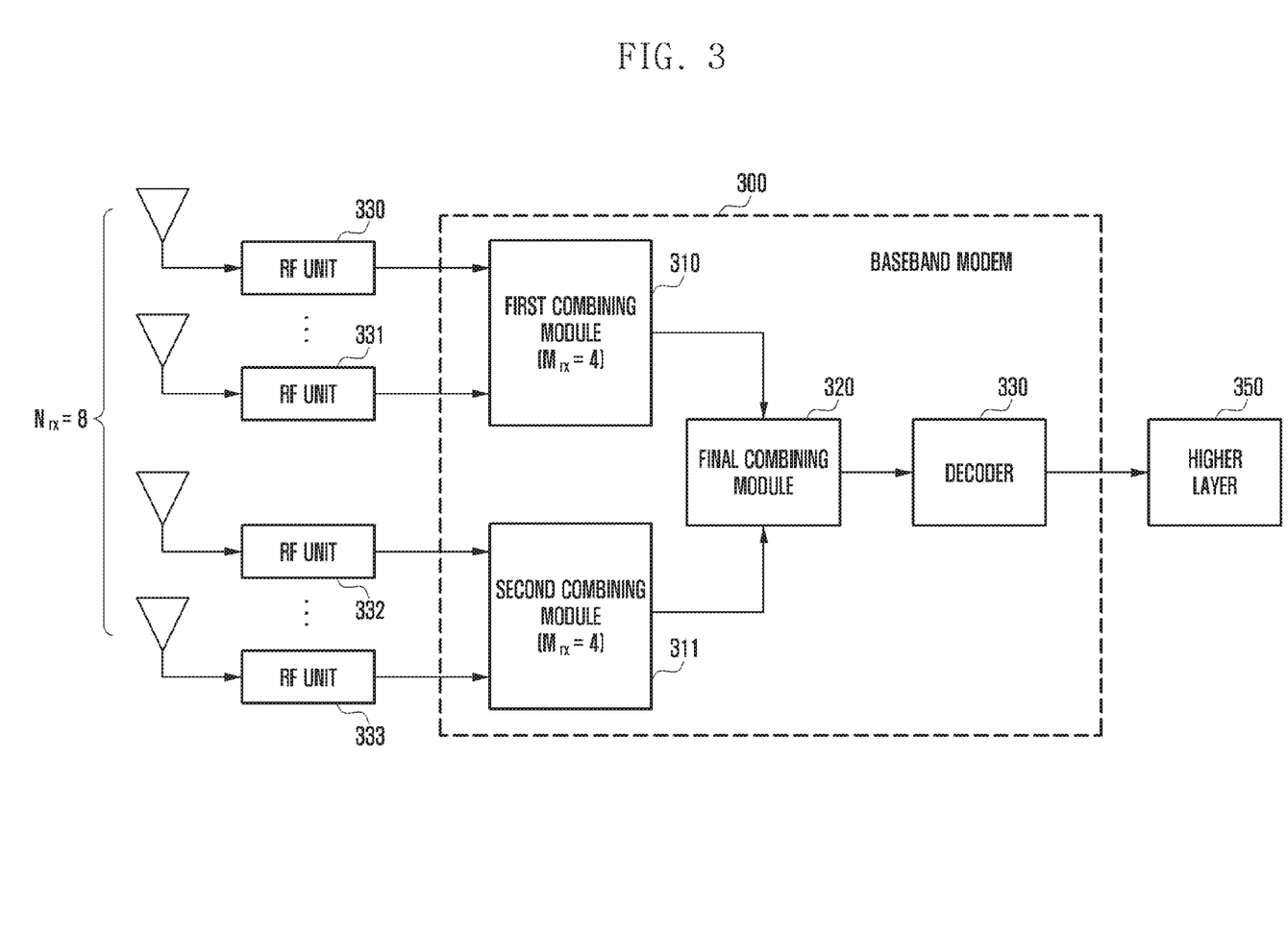
FIG. 3 shows another example of a baseband modem receiving a plurality of radio signals.
Figure 4:
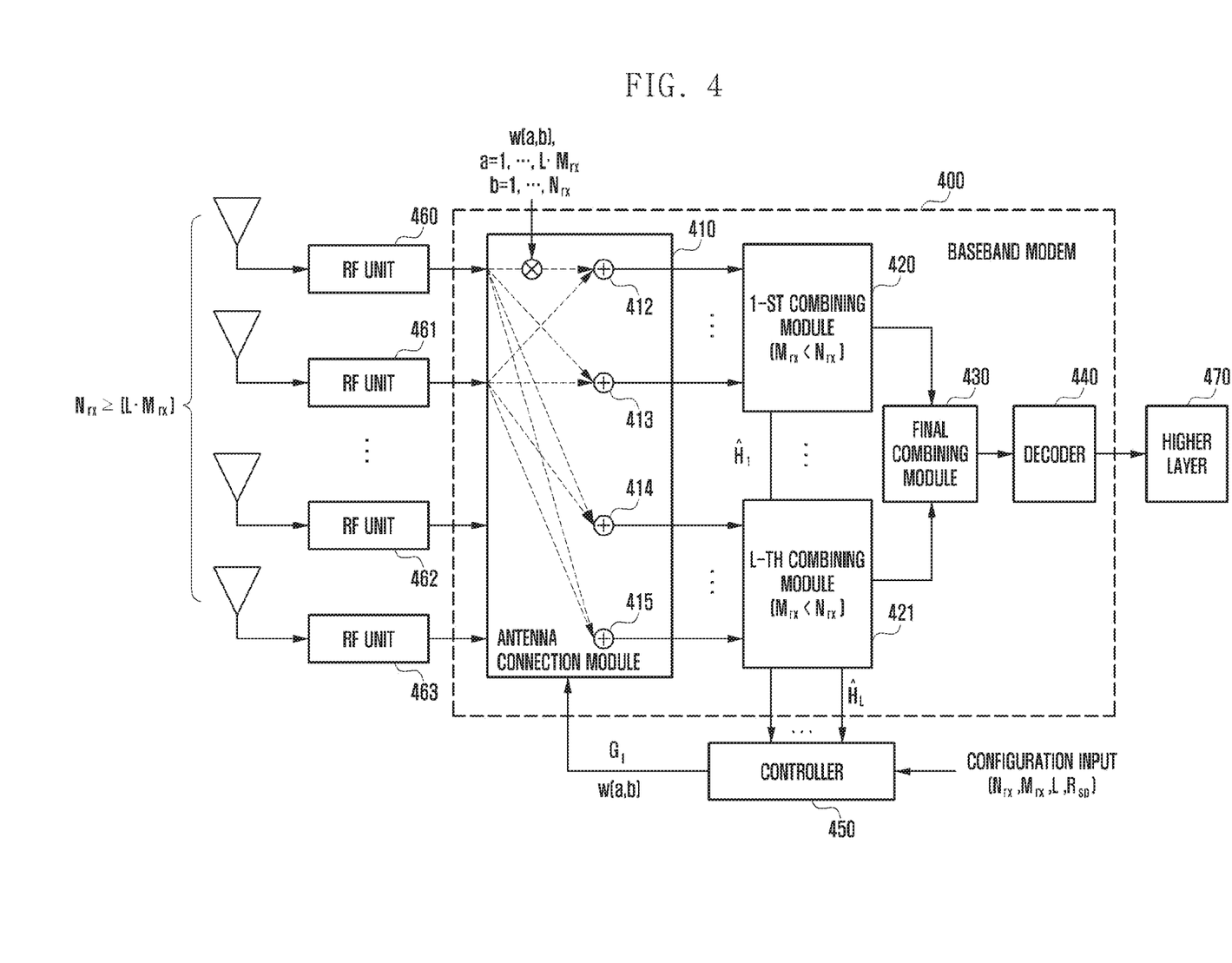
FIG. 4 illustrates an apparatus for combining a plurality of radio signals according to an embodiment of the disclosure.

In such a case where the number of receive antennas is greater than the number of receive antennas that can be handled by the baseband modem, the approach described in FIGS. 2 to 4 can be applied.

FIG. 2 shows another example of a baseband modem receiving a plurality of radio signals.

With reference to FIG. 2, the RF units 230 to 233 may receive Nrx radio signals from the Nrx (e.g., 8) receive antennas and transmit the Nrx radio signals through the RF combining units 240 and 241 to the baseband modem 200.

Each of the RF combining units 240 and 241 may combine a preset number of radio signals (e.g., 2) from the RF units 230 to 233. In one embodiment, the RF combining units 240 and 241 may be implemented by an adder.

For example, the first RF combining unit 240 may combine a first radio signal from the first RF unit 230 and a second radio signal from the second RF unit 231, and output the combined radio signal to the baseband modem 200. The second RF combining unit 241 may combine a third radio signal from the third RF unit 232 and a fourth radio signal from the fourth RF unit 233, and output the combined radio signal to the baseband modem 200.

The baseband modem 200 may include a combining module 210 and a decoder 220. The combining module 210 may process Mrx radio signals output from Mrx (e.g., 4) radio antennas.

In FIG. 2, as Nrx=2*Mrx, the combining module 210 may combine Nrx/2 (=Mrx) radio signals output from the RF combining units 240 and 241 to generate a combined signal. The combining module 210 may output the combined signal to the decoder 220 and the decoder 220 may decode the combined signal and output the decoded signal to the higher layer 250.

That is, in FIG. 2, radio frequency (RF) combining reduces the number of receive antenna signals inputted to the baseband modem up to the number of signals that can be processed by the receiver by summing the received signals of the individual antennas before being input to the baseband modem.

For example, when Nrx=8 and Mrx=4 in FIG. 2, four receive antenna signals are generated by sequentially summing two input receive antenna signals, and are output to the baseband modem. However, as RF combining is not coherent combing, if the summed receive antenna signals do not coincide in phase, the receive antenna combining gain may be not obtained.

FIG. 3 shows another example of a baseband modem receiving a plurality of radio signals.

With reference to FIG. 3, the RF units 330 to 333 may receive Nrx radio signals from the Nrx (e.g., 8) receive antennas and output the Nrx radio signals to the baseband modem 300.

The baseband modem 300 may include a first combining module 310, a second combining module 311, a final combining module (soft-output combiner) 320, and a decoder 330.

The first combining module 310 and the second combining module 311 can each process Mrx radio signals transmitted from the Mrx (e.g., 4) radio antennas, and the final combining module 320 may process a first combined signal output from the first combining module 310 and a second combined signal output from the second combining module 311.

In FIG. 3, as Nrx=2*Mrx, the first combining module 310 and the second combining module 311 may combine Mrx (=Nrx/2) radio signals to generate a first combined signal and a second combined signal, respectively.

The final combining module 320 may combine the first combined signal output from the first combining module 310 and the second combined signal output from the second combining module 311 to generate a final combined signal. The final combining module 320 may output the final combined signal to the decoder 330, and the decoder 330 may decode the final combined signal and output the decoded signal to the higher layer 350.

That is, the combining scheme shown in FIG. 3 may be referred to as soft-output combining or log-likelihood ratio (LLR) combining, where multiple combining modules each capable of combining Mrx antennas less than the total number of receive antennas (Mrx<Nrx) are used to combine all the receive antenna signals.

In FIG. 3, when Nrx=8 and Mrx=4, as L=Nrx/Mrx=2, the baseband modem is constructed using two combining modules, four of the receive antennas are connected to the first combining module and the remaining four are connected to the second combining module, and two soft-output signals combined respectively by the combining modules are combined again for channel decoding.

The combining scheme in FIG. 3 is superior to RF combining shown in FIG. 2, but a performance difference may occur depending on the method of selecting receive antennas to be input to a specific combining module. In addition, it is still not applicable if the total number of receive antennas is greater than the sum of the number of antennas that can be processed by multiple combining modules (Nrx >L*Mrx).

FIG. 4 illustrates an apparatus for combining a plurality of radio signals according to an embodiment of the disclosure.

With reference to FIG. 4, the apparatus for combining a plurality of radio signals according to an embodiment of the disclosure may include Nrx antennas (Nrx≥L*Mrx), RF units 460 to 463 corresponding to the Nrx antennas, a baseband modem 400, and a controller (metric calculator & controller) 450. Here, L is the number of combining modules included in the baseband modem 300, and Mrx is the number of radio signals that can be combined by one combining module.

The RF units 460 to 463 may receive Nrx radio signals from the Nrx antennas and may output the Nrx radio signals to the baseband modem 400.

Here, the baseband modem 400 may generate channel estimation information related to the Nrx radio signals and may combine the Nrx radio signals based on combining control information output from the controller 450.

The baseband modem 400 may include an antenna connection module (virtual mapper & combiner) 410, one or more combining modules 420 and 421, a final combining module (soft-output combiner) 430, and a decoder 440.

The antenna connection module 410 may input all the receive antenna signals to the combining modules 420 and 421, where some or none of the receive antenna signals may be combined with weights depending on the determination of the controller 450.

The antenna connection module 410 may map the RF units 460 to 463 corresponding to the Nrx radio signals to the combining modules 420 and 421 based on the combining control information from the controller 450.

The antenna connection module 410 may include at least one multiplier for setting a weight for at least one of the Nrx radio signals corresponding to the RF units 460 to 463, and at least one adder 412 to 415 for mapping the weighted radio signals to the combining modules 420 and 421.

The combining modules 420 and 421 may receive the mapped radio signals from the antenna connection module 410, generate channel estimation information for the mapped radio signals, and transmit the channel estimation information to the controller 450. Each of the combining modules 420 and 421 may combine the mapped radio signals to generate a combined signal.

The final combining module 430 may combine the combined signals output from the combining modules 420 and 421 to generate a final combined signal. The final combining module 430 may transmit the final combined signal to the decoder 440, and the decoder 440 may decode the final combined signal and transmit the decoded final combined signal to the higher layer 470.

The controller 450 may control the baseband modem 400 based on information output from the baseband modem 400 and preset configuration information.

The controller 450 may generate combining control information based on the channel estimation information received from the combining modules 420 and 421 and preset configuration information, and transmits the combining control information to the baseband modem 400.

Here, the configuration information may include information regarding at least one of the number of antennas corresponding to the RF units 460 to 463 (Nrx), the number of combining modules 420 and 421 included in the baseband modem 400 (L), the number of radio signals that can be combined by each of the combining modules 420 and 421 (Mrx), or spatial correlation information (Rsp) of the plurality of antennas.

In one embodiment, the controller 450 can use the preset spatial correlation information (Rsp). In another embodiment, the controller 450 may generate the spatial correlation information (Rsp) based on the channel estimation information received from the combining modules 420 and 421 and use the generated spatial correlation information (Rsp).

$$Nrx > L \times Mrx \qquad \text{[Equation 1]}$$

If Equation 1 is satisfied, the controller 450 may set a weight for at least one of the Nrx radio signals corresponding to the plurality of antennas and generate combining control information including information on the set weight on the basis of the channel estimation information received from the combining modules 420 and 421.

$$Nrx \leq L \times Mrx \qquad \text{[Equation 2]}$$

If Equation 2 is satisfied, the controller 450 may group the plural antennas corresponding to the RF units 460 to 463 into L antenna groups and generate combining control information including information on the antenna groups on the basis of the channel estimation information and the spatial correlation information.

If the input of the antenna connection module 410 in the baseband is represented by Nrx×1 vector X and the output thereof is represented by LMrx×1 vector Y, the antenna connection module 410 may be defined by LMrx×Nrx virtual connection matrix W (i.e., Y=W·X).

Let the entry at row a and column b of the virtual connection matrix W be w(a, b), a=1, 2, ..., LMrx, and b=1, 2, ..., Nrx. Then, the value of w(a, b) may be set to vary the connection between a receive antenna signal and the antenna connection module 410 of the baseband modem 400.

By using the user's setting input such as the receive antenna information and channel estimation information $\hat{H}_l$=1, ..., L received from each of the combining modules 420 and 421, the controller 450 may group or sum the receive antenna signals and determine the connection with the antenna connection module 410 so as to ensure optimal performance in a given receiver structure.

The criterion for grouping and connecting the receive antennas at the controller 450 is to maximize the channel capacity of the given multi-antenna channel. For given Nrx×Nrx channel matrix H, the mutual information I(x; y) between Ntx×1 transmitted signal vector x and Nrx×1 received signal vector y (y=Hx+n) is given as follows.

$$I(x;y) = \log \det(I_y + HQH^H), \; Q = E[xx^H]$$

Here, $I_{Nrx}$ is Nrx×Nrx unit matrix. In general, it can be assumed that $Q=I_{Nrx}$. Hence, to maximize the channel capacity, the cost function given as a function of the spatial correlation matrix Rsp of the channel must be maximized.

$$C = \det(I_{N_{rx}} + E\{HH^H\}) = \det(I_{N_{rx}} + \hat{R}_{sp}), \hat{R}_{sp} \equiv E\{HH^H\}$$

Meanwhile, if the number of receive antennas is large (e.g., FD-MIMO), the spatial correlation between the receive antennas may be high, and the spatial correlation matrix of the receiving end may be known from the configuration information of the antennas.

$$y = \sqrt{R_{rx}}\tilde{H}x + n, \; H = \sqrt{R_{rx}}\tilde{H}$$

Here, $R_{rx}$, is Nrx×Nrx spatial correlation matrix of the receive antennas and $\tilde{H}$ is Nrx×Ntx i.i.d (independent identically distributed) channel matrix. In this case, the spatial correlation matrix of the receive antennas may be used as the spatial correlation matrix of the channel.

$$\hat{R}_{sp} = E\{\sqrt{R_{rx}}\tilde{H}\tilde{H}^H\sqrt{R_{rx}}\} \approx R_{rx}$$

Next, a description is given of a method for selecting and grouping the receive antennas to minimize the loss of channel capacity using the above cost function.

Figure 5:
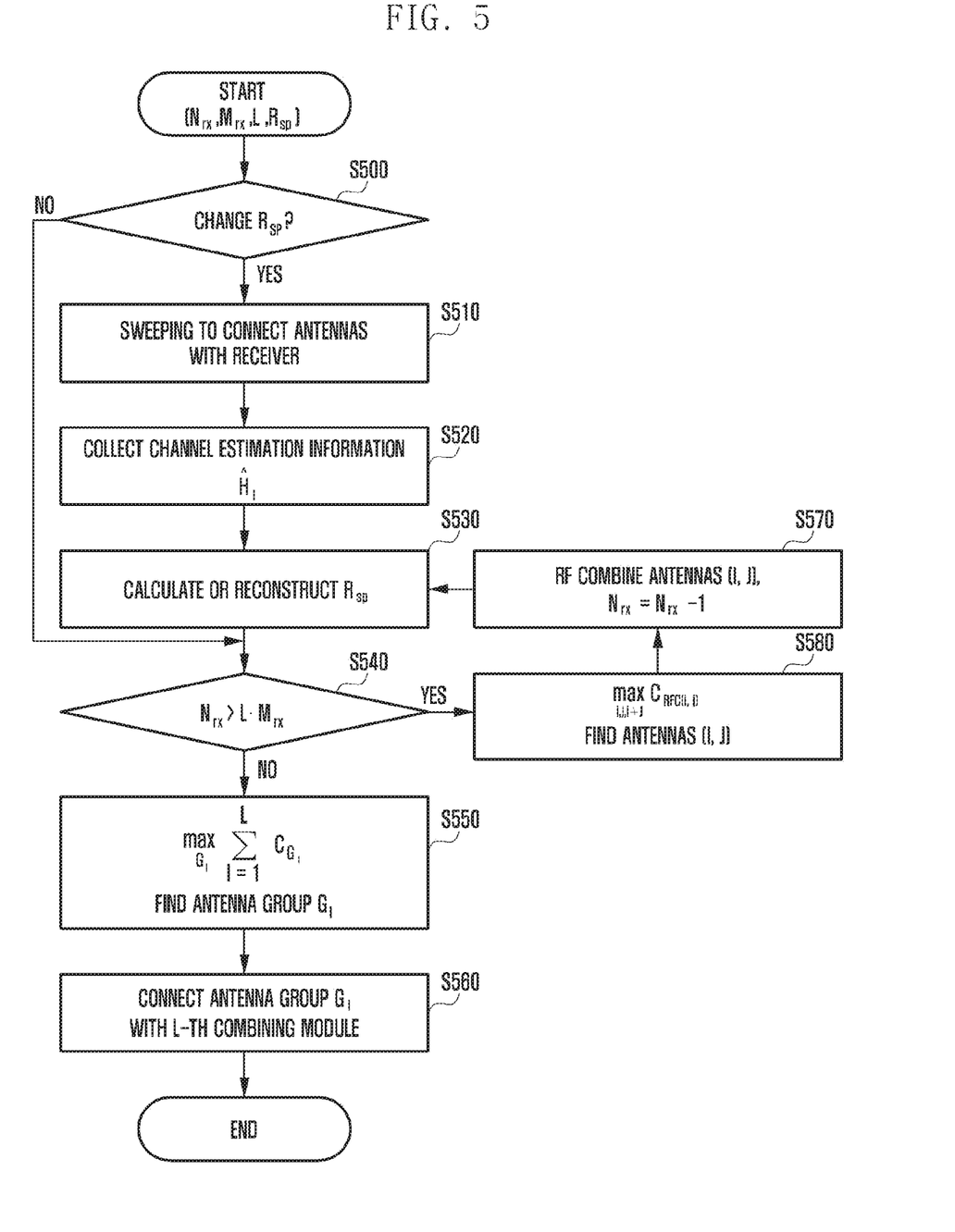
FIG. 5 depicts a method for combining a plurality of radio signals based on parameters according to an embodiment of the disclosure.

FIG. 5 depicts a method for combining a plurality of radio signals based on parameters according to an embodiment of the disclosure.

With reference to FIGS. 4 and 5, at step S500, the combining apparatus according to an embodiment of the disclosure may determine whether the spatial correlation matrix Rsp of the receive antennas is to be changed.

With a given spatial correlation matrix Rsp of the receive antennas, the controller may utilize the spatial correlation matrix Rsp as a user input.

However, if the spatial correlation matrix of the antennas cannot be specified because the user has arbitrarily determined the connection between the antennas and the baseband modem, or if the spatial correlation matrix changes owing to an increase or a decrease in the number of receive antennas or a change in channel characteristics, the apparatus may calculate the spatial correlation matrix $\hat{R}_{sp} = E\{HH^H\}$ using the channel estimation information received from the baseband modem.

At step S510, the apparatus may transmit a preset signal while sequentially connecting Mrx receive antennas to the combining modules at initial installation for the sake of convenience. At step S520, the apparatus may construct a channel vector $\hat{H}$ for all the receive antennas by collecting matrix Mrx×1 channel estimation vectors $\hat{H}_l$, l=1, . . . , L from the combining modules.

In addition, the apparatus may update the spatial correlation matrix periodically or according to a user selection based on the channel estimation vectors received from the combining modules. When the spatial correlation matrix for all the receive antennas is determined, the apparatus can select and group the receive antennas to be RF-combined or soft-output-combined so that the channel capacity is maximized by using the spatial correlation matrix.

That is, at step S530, the apparatus can calculate or reconstruct the spatial correlation matrix.

At step S540, if all of the Nrx receive antennas cannot be processed using the L combining modules configured at the receiver (Nrx >L*Mrx), the apparatus should sum some of the receive antenna signals through RF combining so that the number of receive antennas is less than or equal to the number of antennas that can be processed by the baseband modem.

RF combining itself is not beneficial, but the channel capacity may be reduced when receive antennas are RF-combined randomly. Hence, in the disclosure, a pair of receive antennas are selected so as to minimize a decrease in channel capacity.

To sum K receive antenna signals, it is assumed that the summed signal is normalized by sqrt(K) in consideration of a noise increase. If the spatial correlation matrix Rsp of the receive antennas is given, the spatial correlation matrix $R_{RFC}$ after RF combining specific receive antennas can be reconstructed by summing the correlation coefficients of the original spatial correlation matrix Rsp.

For example, when Nrx=4, Mrx=2, and L=1, for RF combining receive antennas 1, 2 and 3, 4, the spatial correlation matrix $R_{RFC}$ can be reconstructed as follows.

$$R_{RFC} = \begin{bmatrix} R_{11} + R_{12} + R_{21} + R_{22} & R_{13} + R_{14} + R_{23} + R_{24} \\ R_{31} + R_{32} + R_{41} + R_{42} & R_{33} + R_{34} + R_{43} + R_{44} \end{bmatrix}$$

Here, $R_{i,j}$ is the (i,j) entry of the original spatial correlation matrix Rsp. When receive antennas (i,j) are RF-combined to reduce the number of receive antenna signals by one, if the reconstructed spatial correlation matrix is $R_{RFC}(i,j)$, receive antennas can be selected so that the channel capacity is maximized as follows.

$$\max_{(i,j),i \neq j} C_{RFC(i,j)} = \max_{(i,j),i \neq j} \det\{I_{N_{rx}-1} + R_{RFC(i,j)}\}, i, j = 1, 2, \ldots, N_{rx}$$

$$C_{RFC(i,j)} \equiv \det\{I_{N_{rx}-1} + R_{RFC(i,j)}\}$$

Here, $C_{RFC(i,j)}$ is the cost function for selecting the receive antennas (i,j) to be RF combined. If the indexes of the receive antennas to be RF combined are selected as {i, j} and are used as the c-th baseband input signal, the entry of the virtual connection matrix W can be set as follows.

$$w(a, b) = \begin{cases} 1, & \text{for } a = b, a \neq k \\ 0, & \text{for } a \neq b, b \neq \{i, j\} \\ \dfrac{1}{\sqrt{K}}, & \text{for } a = c, b = \{i, j\}, \text{ where } K = 2 \end{cases}$$

Generally in the spatial correlation characteristics of the antennas, the spatial correlation coefficient is high when the polarization is the same and the distance is close, and RF combining the antenna pair having a high correlation coefficient can reduce a loss of channel capacity.

Hence, to select the antennas to be RF-combined in a near optimal way, the cost function can be simplified as follows by excluding determinant calculation.

$$C'_{RFC(i,j)} \approx R_{i,j}, \; i,j=1,2,\ldots,N_{rx}$$

At step S570, if it is determined to reduce the number of receive antennas by K so as to satisfy Nrx=L*Mrx, the above procedure may be repeated K times. When the number of receive antennas is reduced below the number of antennas that can be processed by the baseband modem, the receive antennas can be grouped as follows to maximize the channel capacity using L combining modules.

The Nrx receive antennas are divided into L groups whose size is less than or equal to Mrx, and the l-th antenna index set is denoted by $G_l$, and the size of the corresponding set is denoted by $|G_l|(|G_l| \leq M_{rx})$.

As each antenna group is combined by one combining module and the soft-outputs are summed, when the antenna groups are formed such that the sum of the channel capacities of the antenna groups is maximized, the maximum channel capacity achievable by the given receiver is obtained. Hence, the cost function for forming the receive antenna groups is given as follows.

$$C_{total} = \max_{G_l} \sum_{l=1}^{L} C_{G_l} = \max_{G_l} \sum_{l=1}^{L} \det(I_{|G_l|} + R_{G_l})$$

$$C_{G_l} \equiv \det(I_{|G_l|} + R_{G_l}), l = 1, \ldots, L, R_{G_l} \subset R_{sp}$$

Here, $C_{G_l}$ is the cost function for the receive antenna group $G_l$, and $R_{G_l}$ is the spatial correlation matrix for the receive antenna group $G_l$.

With a given spatial correlation matrix Rsp of all the receive antennas, as in RF combining, the receive antenna group that maximizes the cost function is determined by reconstructing $R_G$, using the correlation coefficients of the receive antennas included in each antenna group. When each group is determined, the entries of the virtual connection matrix can be set so as to optimally connect the receive antenna signals and the baseband combining modules.

For example, in a system where Nrx=5, Mrx=2 and L=2, when the indexes of the antennas to be RF combined are 2 and 3, the receive antenna group to be connected to the first combining module is {2,3,4}, and the receive antenna group to be connected to the second combining module is {1,5}, the virtual connection matrix W can be set as follows.

$$W = \begin{bmatrix} 0 & 0 & 0 & 1 & 0 \\ 0 & 1/\sqrt{2} & 1/\sqrt{2} & 0 & 0 \\ 1 & 0 & 0 & 0 & 0 \\ 0 & 0 & 0 & 0 & 1 \end{bmatrix}$$

If there are antenna groups with weights determined for transmission as in transmit antenna beamforming, they can be applied to the virtual connection matrix of the receive antennas based on the reciprocity between transmission and reception. In this case, w(a, b) may be set to any complex value other than $$\left\{ 0, 1, \frac{1}{\sqrt{K}} \right\}.$$

In the antenna grouping process, if Nrx=L*Mrx, all of the L antenna groups have the same size Mrx. If Nrx<L*Mrx, some antenna groups may have a size smaller than Mrx. In this case, it is possible to feed $|G_l|(|G_l|<M_{rx})$ antenna signal inputs and $(M_{rx}-|G_l|)$ null inputs to the corresponding combining module. It is also possible to group the antennas so that the group size is always Mrx by allowing repeated selection of the same antenna.

If repeated antenna selection is allowed, the complexity of antenna group search may increase, but the diversity gain of the IRC receiver can be maintained when the number of interference signals is large.

Figure 6:
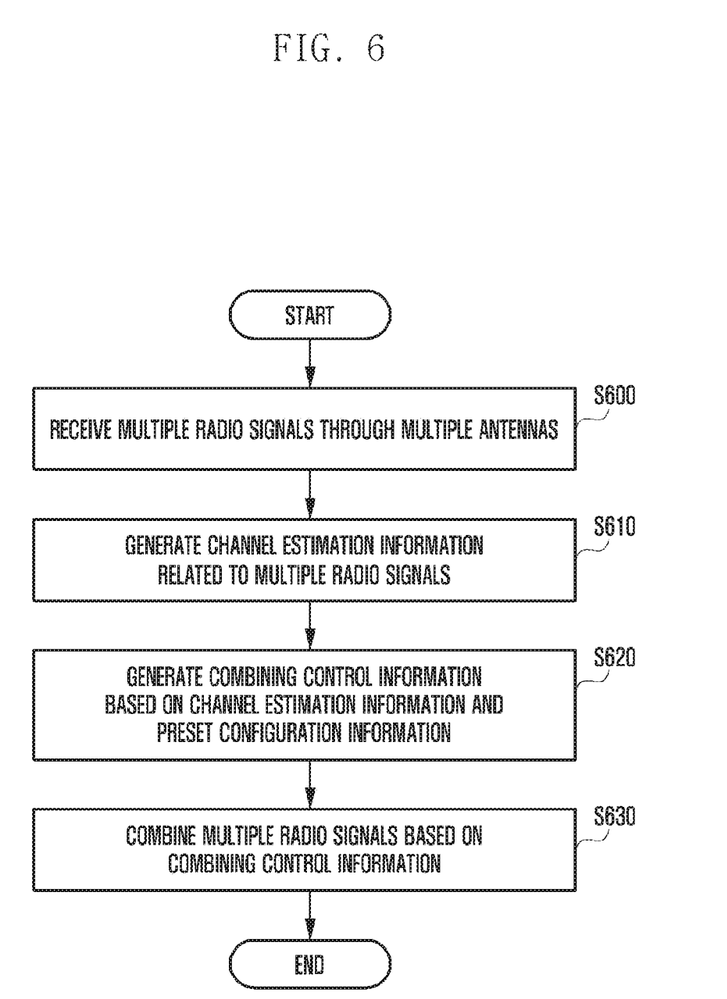
FIG. 6 depicts a method for combining a plurality of radio signals according to an embodiment of the disclosure.

FIG. 6 depicts a method for combining a plurality of radio signals according to an embodiment of the disclosure.

With reference to FIG. 6, the combining apparatus according to an embodiment of the disclosure can receive a plurality of radio signals through a plurality of antennas (S600).

The apparatus may generate channel estimation information related to the plurality of radio signals (S610), and may generate combining control information based on the channel estimation information and the preset configuration information (S620).

The apparatus may combine the radio signals based on the combining control information (S630).

In one embodiment, the apparatus may map the plurality of antennas corresponding to the radio signals to one or more combining modules based on the combining control information. Here, the apparatus may perform at least one multiplication operation to set a weight for at least one of the radio signals corresponding to the plurality of antennas, and at least one addition operation to map the weighted radio signals to the one or more combining modules.

In one embodiment, the apparatus may combine a plurality of combined radio signals to generate a combined signal and decode the combined signal.

Figure 7:
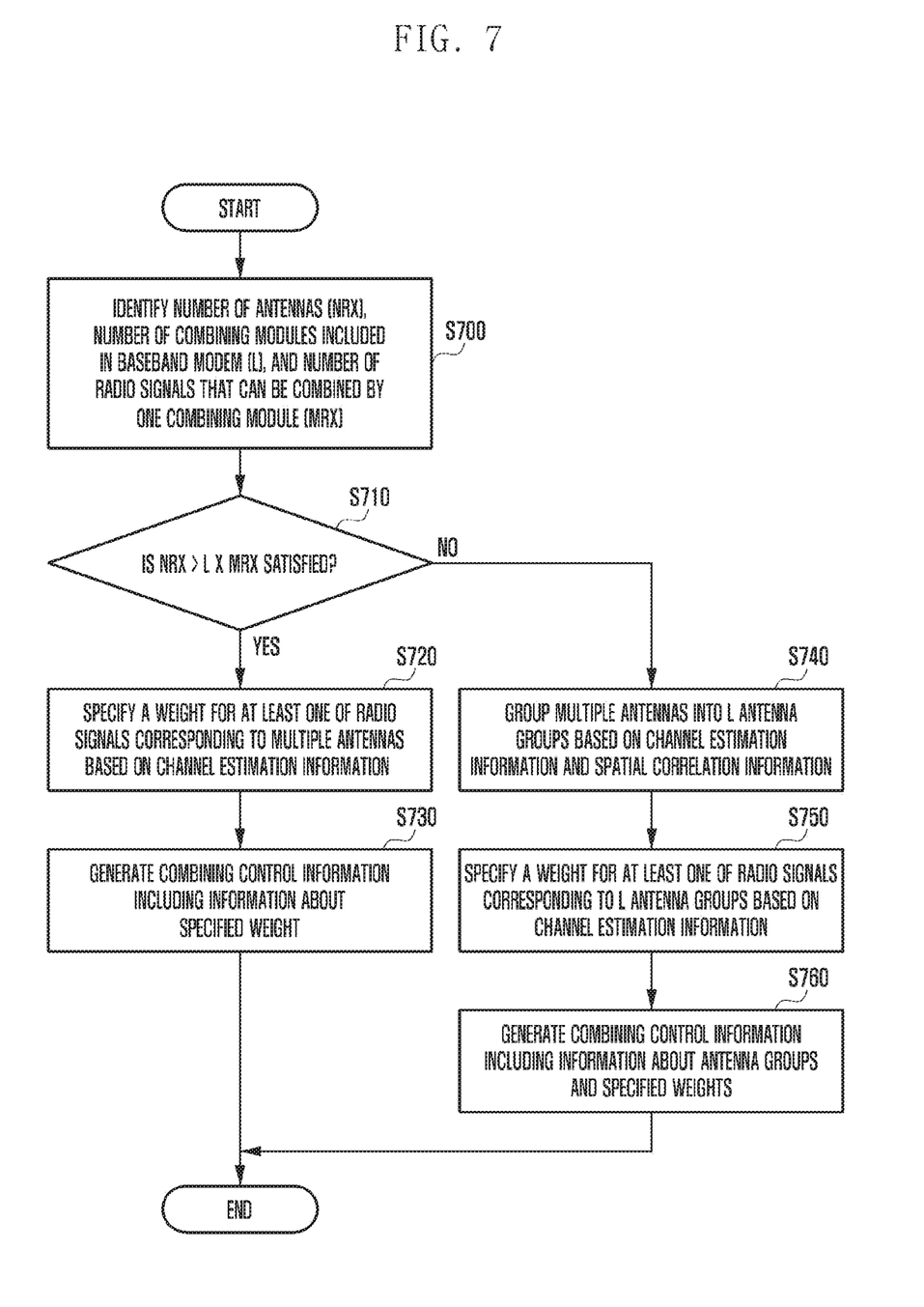
FIG. 7 depicts a procedure for generating combining control information according to an embodiment of the disclosure.

FIG. 7 depicts a procedure for generating combining control information according to an embodiment of the disclosure.

With reference to FIG. 7, the combining apparatus according to an embodiment of the disclosure may identify the number of antennas (Nrx), the number of combining modules (L) included in the baseband modem, and the number of radio signals that can be combined by one combining module (Mrx) (S700).

The apparatus can determine whether the condition "Nrx>L×Mrx" is satisfied (S710).

If the condition "Nrx>L×Mrx" is satisfied at step S710, the apparatus can specify a weight for at least one of the radio signals corresponding to the plurality of antennas based on the channel estimation information (S720). Then, the apparatus can generate combining control information including information about the specified weight (S730).

If the condition "Nrx>L×Mrx" is not satisfied at step S710, the apparatus may group the plurality of antennas into L antenna groups based on channel estimation information and spatial correlation information (S740). Then, the apparatus may specify a weight for at least one of the radio signals corresponding to the L antenna groups based on the channel estimation information (S750). The apparatus may generate combining control information including information on the antenna groups and specified weights (S760).

Hereinabove, various embodiments of the disclosure have been shown and described for the purpose of illustration without limiting the subject matter of the disclosure. It should be understood by those skilled in the art that many variations and modifications of the method and apparatus described herein will still fall within the spirit and scope of the disclosure as defined in the appended claims and their equivalents. The embodiments may also be carried out in combination with each other as needed.

The invention claimed is:

1. An apparatus for combining a plurality of radio signals, comprising:
   a plurality of antennas configured to receive multiple radio signals;
   a baseband modem configured to generate channel estimation information related to the multiple radio signals, and combine the radio signals based on combining control information; and a controller configured to generate the combining control information based on the channel estimation information and preset configuration information, and output the combining control information to the baseband modem, wherein the preset configuration information includes information regarding a number of antennas (Nrx), a number of combining modules in the baseband modem (L), and a number of radio signals that can be combined by one combining module (Mrx), and wherein in case that Equation 1 below is satisfied, $$Nrx > L \times Mrx \qquad \text{[Equation 1]}$$

the controller is further configured to specify a weight for at least one of the radio signals corresponding to the plurality of antennas based on the channel estimation information and generate the combining control information including information on the specified weight.

2. The apparatus of claim 1, wherein the preset configuration information spatial correlation information of the antennas (Rsp).

3. The apparatus of claim 1, wherein the baseband modem comprises:
   at least one combining module configured to generate the channel estimation information and output the same to the controller, and combine the radio signals;
   an antenna connection module configured to map the antennas to the at least one combining module based on the combining control information; and
   a decoder configured to decode the combined radio signals.

4. The apparatus of claim 2, wherein the controller is configured to utilize the spatial correlation information (Rsp) set in advance or the spatial correlation information (Rsp) generated based on the channel estimation information.

5. The apparatus of claim 2, wherein if Equation 2 below is satisfied, $$Nrx \leq L \times Mrx \qquad \text{[Equation 2]}$$

the controller is configured to group the plurality of antennas into L antenna groups based on the channel estimation information and the spatial correlation information, and generate the combining control information including information on the antenna groups.

6. The apparatus of claim 3, wherein the antenna connection module comprises:
   at least one multiplier configured to specify a weight for at least one of the radio signals corresponding to the plurality of antennas; and
   at least one adder configured to map the weighted radio signals to the at least one combining module.

7. The apparatus of claim 3, wherein the baseband modem further comprises a final combining module that is configured to receive signals from the at least one combination module, combine the signals to generate a final combined signal, and output the final combined signal to the decoder.

8. A method for combining a plurality of radio signals, the method comprising:
   receiving multiple radio signals;
   generating channel estimation information related to the multiple radio signals;
   generating combining control information based on the channel estimation information and preset configuration information; and
   combining the multiple radio signals based on the combining control information,
   wherein the preset configuration information includes information regarding a number of antennas (Nrx), a number of combining modules in a baseband modem (La, and a number of radio signals that can be combined by one combining module (Mrx), and
   wherein the method further comprises, in case that Equation 1 below is satisfied:

$$Nrx > L \times Mrx \qquad \text{[Equation 1]}$$

specifying a weight for at least one of the radio signals corresponding to the multiple antennas based on the channel estimation information; and
   generating the combining control information including information on the specified weight.

9. The method of claim 8, wherein the preset configuration information includes spatial correlation information of the antennas (Rsp).

10. The method of claim 8, further comprising mapping a plurality of antennas corresponding to the radio signals to at least one combining module based on the combining control information.

11. The method of claim 9, wherein the spatial correlation information (Rsp) set in advance or the spatial correlation information (Rsp) generated based on the channel estimation information is utilized.

12. The method of claim 9, further comprising if Equation 2 below is satisfied:

$$Nrx \leq L \times Mrx \qquad \text{[Equation 2]}$$

grouping the multiple antennas into L antenna groups based on the channel estimation information and the spatial correlation information; and
   generating the combining control information including information on the antenna groups.

13. The method of claim 10, wherein mapping a plurality of antennas comprises:
   performing at least one multiplication operation to specify a weight for at least one of the radio signals corresponding to the plurality of antennas; and
   performing at least one addition operation to map the weighted radio signals to the at least one combining module.

\* \* \* \* \*